United States Patent

Baek

[11] Patent Number: 5,847,667
[45] Date of Patent: Dec. 8, 1998

[54] DIGITAL-TO-ANALOG CONVERTER INTERFACE APPARATUS

[75] Inventor: Woon-Kwang Baek, Pucheon, Rep. of Korea

[73] Assignee: Samsung Electronics, Co., Ltd., Suwon, Rep. of Korea

[21] Appl. No.: 777,513

[22] Filed: Dec. 30, 1996

[30] Foreign Application Priority Data

Dec. 29, 1995 [KR] Rep. of Korea ........................ 95-66857

[51] Int. Cl.⁶ .................................................. H03M 9/00
[52] U.S. Cl. .......................................... 341/101; 341/144
[58] Field of Search ..................... 341/100, 101, 341/144

[56] References Cited

U.S. PATENT DOCUMENTS

| | | | |
|---|---|---|---|
| 4,381,495 | 4/1983 | Hotta et al. | 341/144 |
| 4,929,947 | 5/1990 | Toyama | 341/146 |
| 5,182,559 | 1/1993 | Tokuyama | 341/144 |
| 5,563,954 | 10/1996 | Ford et al. | 341/100 |

*Primary Examiner*—Marc S. Hoff
*Attorney, Agent, or Firm*—Marger, Johnson, McCollom, & Stolowitz P.C.

[57] ABSTRACT

Interface circuitry is disclosed for interfacing a digital circuit to a digital-to-analog converter (DAC). The interface circuitry receives a digital input word and provides for interfacing to the DAC in any one of several formats as may be required by the particular DAC. These formats include various bit serial formats, LSB first, MSB first, etc. The interface circuitry provides clock and control signals for interfacing with the DAC in the required format.

14 Claims, 4 Drawing Sheets

DIGITAL-TO-ANALOG CONVERTER INTERFACE APPARATUS

BACKGROUND OF THE INVENTION

The present invention relates to an interface circuit, and more particularly, to a digital-to-analog converter (DAC) interface apparatus for interfacing the DAC with other components of a given system.

In general, a device which requires an external DAC usually includes an internal interface circuit in order to adapt the data format with the DAC. However, the internal DAC interface circuit has a fixed format usually such that it can interface only with a specific DAC.

For this reason, the type of DAC which is attached to the interface circuit cannot be changed due to the difference in data formats.

SUMMARY OF THE INVENTION

It is an object of the present invention to provide a DAC interface apparatus capable of interfacing with various types of DACs.

To achieve the above object, there is provided a DAC interface apparatus for interfacing a digital-to-analog converter with equipment which requires the digital-to-analog converter, comprising data input means for receiving parallel digital data from the equipment in response to a data loading signal, storing it, and outputting it in response to a first and a second control signals. Data output means for selectively outputting data input from the data input means in response to the first and the second format control signals and a left/right signal are provided, the invention further includes system clock generating means for generating a main clock signal for the digital-to-analog converter interface apparatus, bit clock generating means for dividing the frequency of the main clock signal in response to a format control signal and inverting the frequency-divided main clock signal, control clock generating means for dividing the frequency-divided main clock signal and generating a first through a sixth control clock signals for controlling the digital-to-analog converter, word clock generating means for receiving the first through the fourth control clock signals and an inverted signal of the fourth control signal, and generating a left-cancelling signal and a right-cancelling signal, selecting one of the left-cancelling signal and the right-cancelling signals in response to the first and the second format control signals to output the selected signal as the fourth control signal, and selecting one of the control clock signals and the inverted signal of the fourth control signal in response to the third format control signal to output the selected signal as a third control signal, load clock generating means for receiving the control clock signals and the frequency-divided main clock signal and outputting the second control signal and the data loading signal in response to the format control signal and a first OR gate for performing a logic OR operation with respect to the fourth control signal and the frequency-divided main clock signal and outputting the result as the first control signal, wherein the third format control signal is obtained by performing a NOR operation with respect to the second format control signal and the inverted signal of the first format control signal, and the left/right signal defines the justification of the data output to the digital-to-analog converter.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
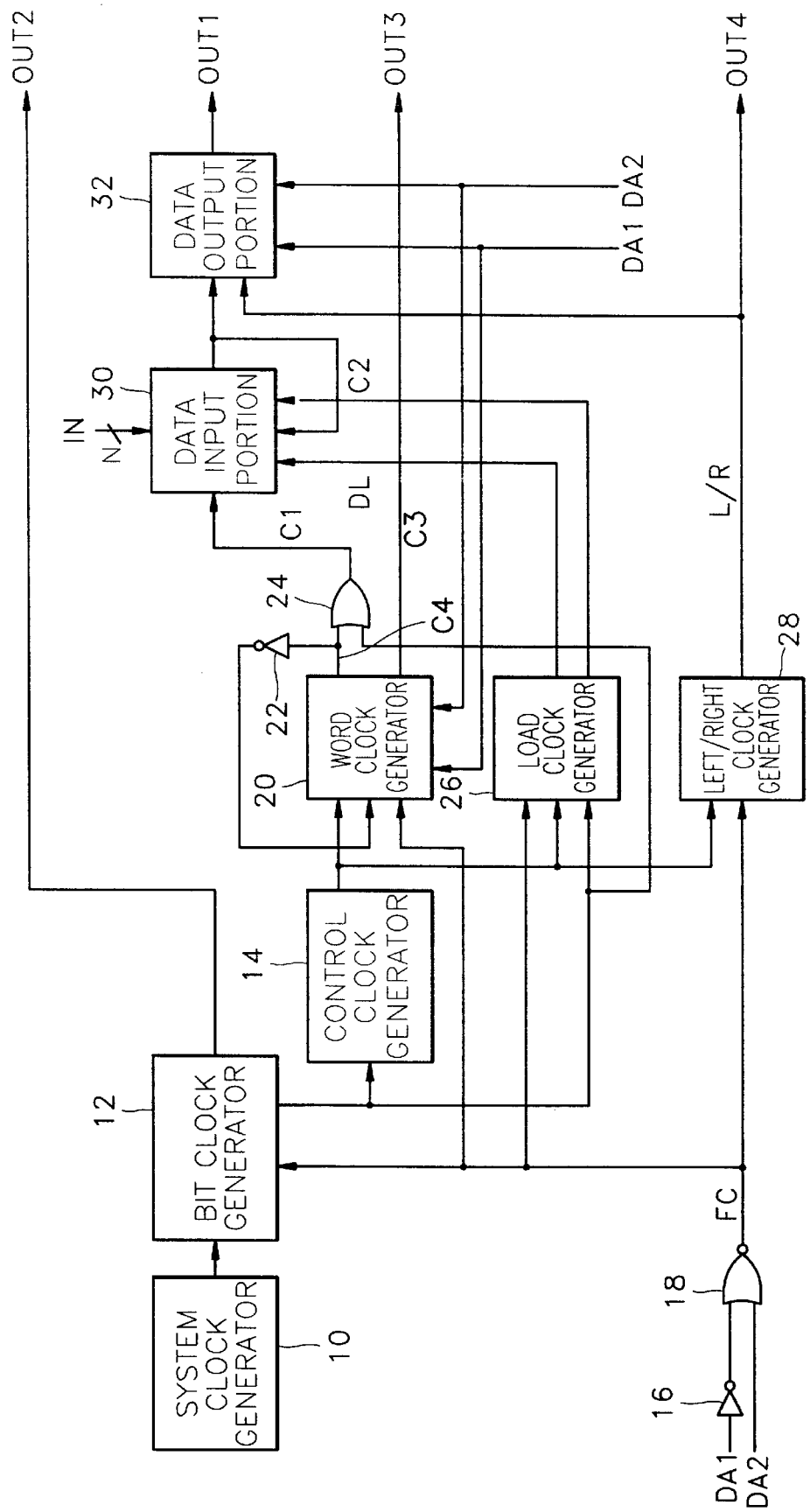
FIG. 1 is a block diagram of a digital-to-analog converter (DAC) interface apparatus according to the present invention.

Referring to FIG. 1 the DAC interface apparatus according to the present invention includes a system clock signal generator 10, a bit clock generator 12, a control clock generator 14, an inverter 16, a NOR gate 18, a word clock generator 20, an inverter 22, an OR gate 24, a load clock generator 26, a left/right signal generator 28, a data inputting portion 30 and a data output portion 32.

The data input portion 30 shown in FIG. 1 receives and stores a parallel digital data signal of N bits input to an input terminal IN in response to a data loading signal DL from the load clock generator 26, and outputs the stored data to the data output portion 32 in response to first and second control signals C1 and C2 which are respectively output by the OR gate 24 and the load clock generator 26.

The data output portion 32 selectively and serially outputs through an output terminal OUT1, the data which is input from the data input portion 30 in response to first and second format control signals DA1 and DA2 and left/right signals L/R. The system clock generator 10 generates a main clock signal for the DAC interface apparatus according to the present invention.

The bit clock generator 12 divides the frequency of the main clock signal in response to a third format control signal FC from the NOR gate 18 and outputs through an output terminal OUT2, the frequency-divided main clock signal as the signal which controls the DAC (not shown), in order for the DAC to receive the serial data which is output through the output terminal OUT1.

The control clock signal generating portion 14 generates control clock signals for controlling the DAC in response to the frequency-divided main clock signal. The word clock generator 20 receives the control clock signals and an inversion of a fourth control signal C4, and selects one of such signals in response to the first and second format control signals DA1 and DA2 and the third format control signal FC. The word clock generator 20 outputs a third control signal C3 for controlling the output of data from the data output portion 32 to the DAC through an output terminal OUT3, and outputs a fourth control signal C4 to the OR gate 24.

The load clock generator 26 receives the control clock signal and the frequency-divided main clock signal and outputs a second control signal C2 and a data loading signal DL to the data input portion 30 in response to the format control signal FC. The OR gate 24 receives the fourth control signal C4 and the frequency-divided main clock signal and outputs a first control signal C1 to the data input portion 30. Here, a left/right signal L/R is for classifying the data output to the DAC.

Figure 2A:
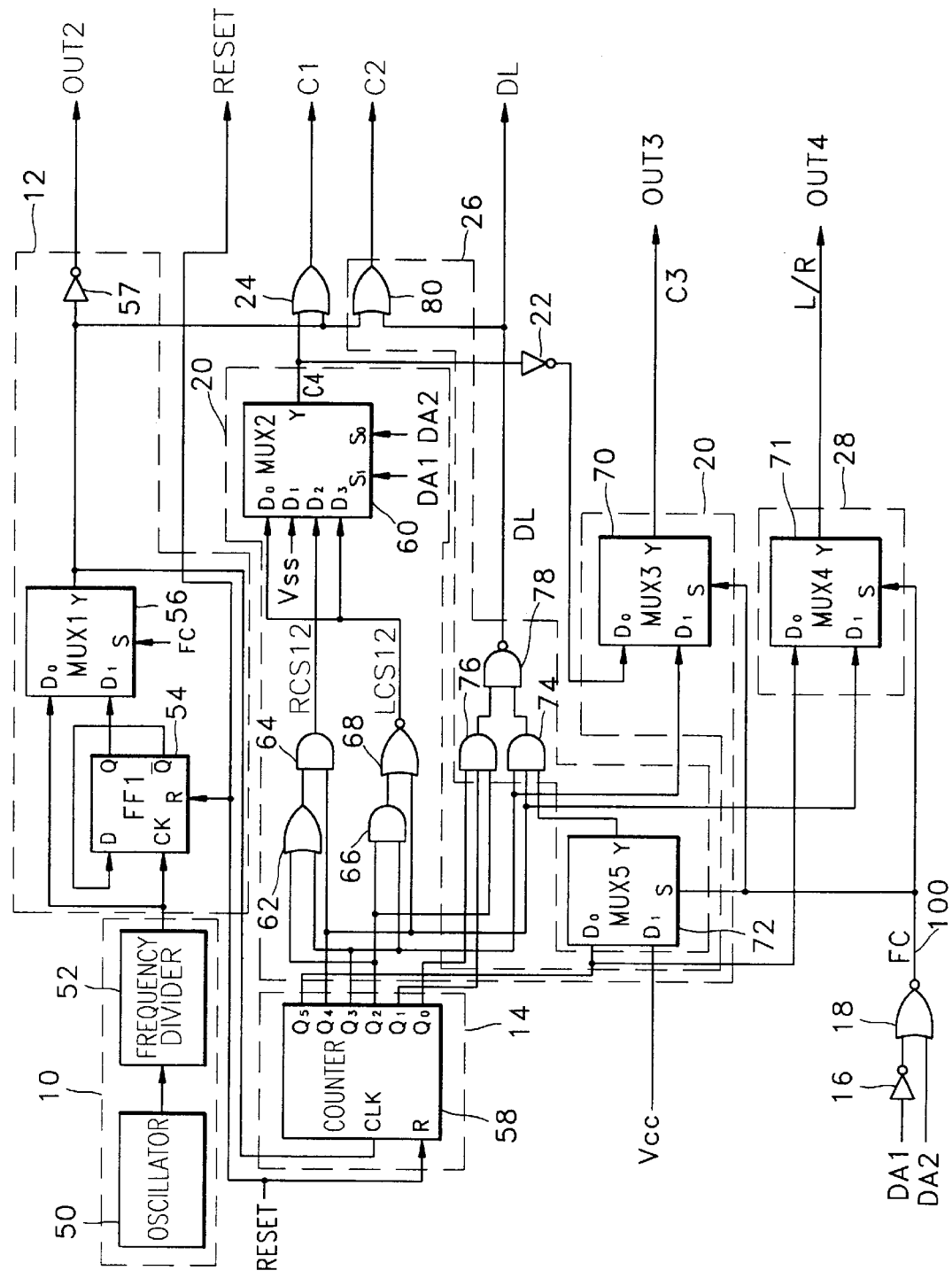
FIGS. 2A and 2B together form a detailed circuit diagram of the DAC interface circuit according to the present invention.
Figure 2B:
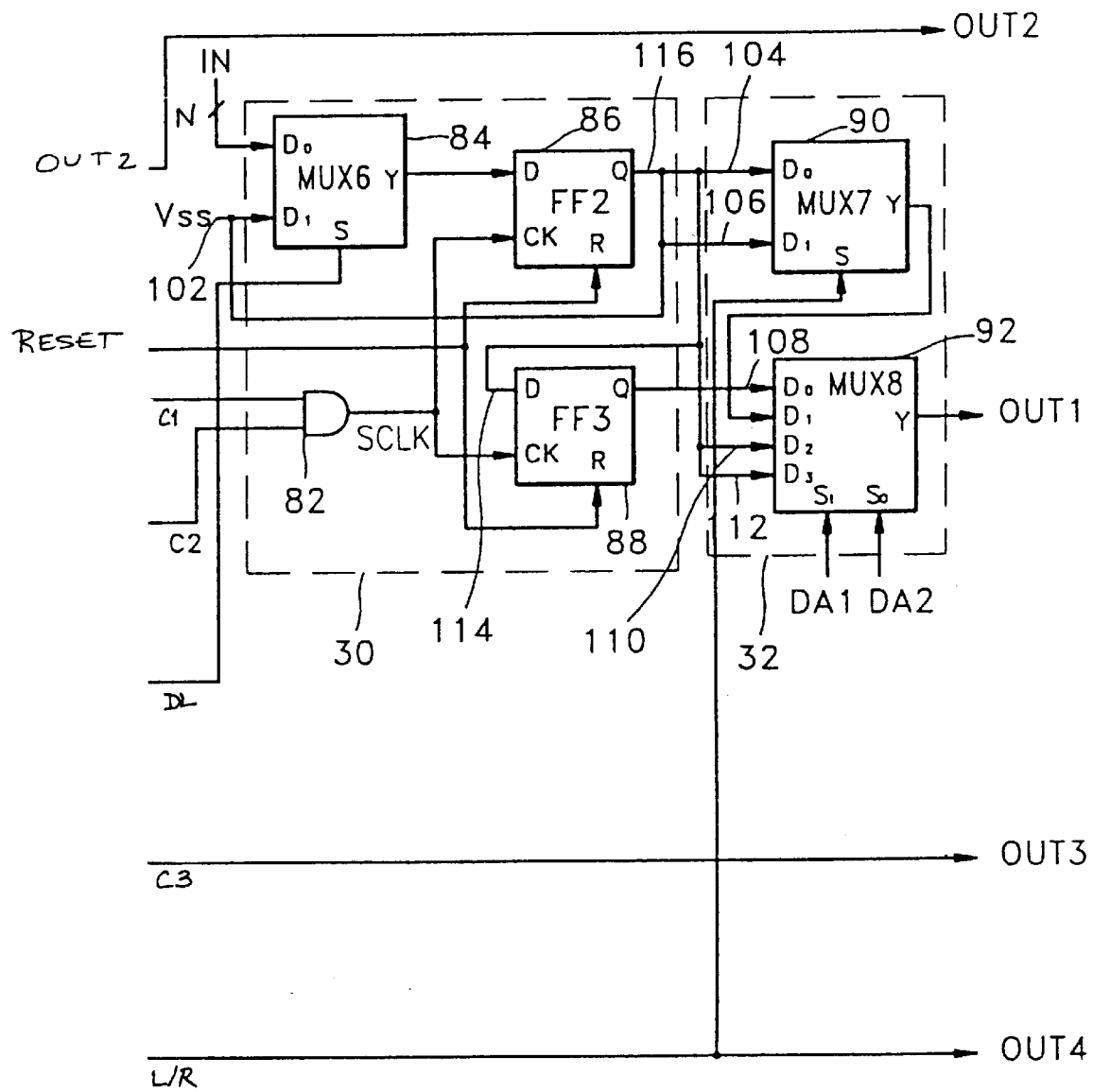

FIG. 2 is a detailed circuit diagram of the DAC interface circuit according to the present invention.

In FIG. 2, the system clock generator 10 includes an oscillator 50 for generating a signal having a predetermined frequency and a frequency divider 52 for dividing the signal output by the oscillator 50 by a predetermined number and outputting the divided signal as the main clock signal.

The bit clock generator 12 includes a first flip-flop 54 having its inverted output tied to its input, a first multiplexor 56 for selecting either the output of the first flip-flop 54 or the main clock signal in response to the format control signal FC and outputting the selected signal as the frequency-divided main clock signal, and a first inverter 57 for inverting the frequency-divided main clock signal and outputting it through the output terminal OUT2, receives the main clock signal through the clock input terminal of the first flip-flop 54.

The control clock generator 14 comprises a counter 58 receives the frequency-divided main clock signal, counts such signal repetitively, and outputs the counted values through output terminals $Q_5$, $Q_4$, $Q_3$, $Q_2$, $Q_1$, and $Q_0$ as sixth, fifth, fourth, third, second, and first control clock signals, respectively.

The word clock signal generating portion 20 includes logic gates 62, 64, 66, 68, multiplexers 60 and 70. The OR gate 62 receives the third and fourth control clock signals and performs a logic OR operation with respect to such signals. The first AND gate 64 inputs the output of the OR gate 62 and the second control clock signal and performs a logic AND operation. The second AND gate 66 inputs the third and fourth control clock signals and performs a logic AND operation. The NOR gate 68 inputs the output of the second AND gate 66 and the fifth control clock signal and performs a NOR operation. The second multiplexor 60 inputs the output of the NOR gate 68, the output of the first AND gate 64, or a first supply voltage Vss, selects one of such signals in response to the first and the second format control signals DA1 and DA2, and outputs the selected signal as the fourth control signal C4. The third multiplexor 70 inputs the inverted fourth control signal C4 and the fourth control clock signal, selects one of such signals in response to the format control signal FC, and outputs the selected signal as the third control signal C3.

A fourth multiplexor 71, which serves as the left/right signal generator 28, receives the fifth or sixth control clock signals, selects one of such signals in response to the format control signal FC, and outputs the selected signal as the left/right signal L/R.

The load clock signal generating portion 26 includes multiplexer 72, logic gates 76, 74, 78 and 80. The fifth multiplexor 72 selects one of the sixth control clock signal and a second supply voltage Vcc in response to the format control signal FC. The third AND gate 76 performs a logic AND operation with respect to the first, second, and third control clock signals. The fourth AND gate 74 performs a logic AND operation with respect to the fourth and the fifth control clock signals and the output of the fifth multiplexor 72. The NAND gate 78 inputs the output of the third and fourth AND gates 76 and 74, performs a logic NAND operation with respect to such signals and outputs the result as a data loading signal DL. The third OR gate 80 inputs the output of the NAND gate 78 and the frequency-divided clock signal from the first multiplexer 56, performs a logic OR operation with respect to such signals, and outputs the result as the second control signal C2.

The data input portion 30 includes 84, 82, 86, and 88. The sixth multiplexor 84 receives an input parallel data, a predetermined bit among its own output bits and a first supply voltage level Vss and selects one of such signals in response to the data loading signal DL. The fifth AND gate 82 performs a logic AND operation with respect to the first and second control signals C1 and C2. The second flip-flop 86 receives the output of the sixth multiplexor 84 as a data input and the output of the fifth AND gate 82 as a clock input and outputs the input data to the data output portion 32 according to the clock input signal. The third flip-flop 88 receives the last bit of the serial data from the second flip-flop 86 as a data input and the output of the fifth AND gate 82 as a clock input according to the signal applied to the clock (ck) terminal, and outputs the input data to the data output portion 32 according to the clock input.

The data output portion 32 includes 90 and 92. The seventh multiplexor 90 receives predetermined bits among the positive outputs Q of the second flip-flop 86 and selectively outputs the received data in response to the left/right signal L/R. The eighth multiplexor 92 receives the outputs of the second and the third flip-flops 86 and 88 and the output of the seventh multiplexor 90 to selectively output one among them through the output terminal OUT1 as serial data in response to the first and the second format control signals DA1 and DA2.

Figure 3A:
FIG. 3A is a timing diagram of a left/right signal in the DAC interface apparatus shown in FIG. 2.
Figure 3B:
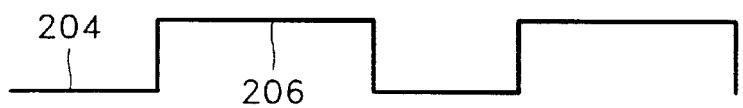
FIG. 3B is a timing diagram of a third control signal in the DAC interface apparatus in case that DA1 and DA2 are '00'.
Figure 3C:
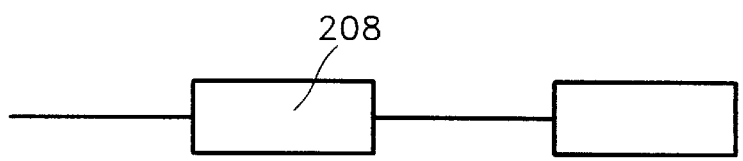
FIG. 3C is a timing diagram of a serial data output from the data output portion in the DAC interface apparatus in case that DA1 and DA2 are '00'.
Figure 3D:
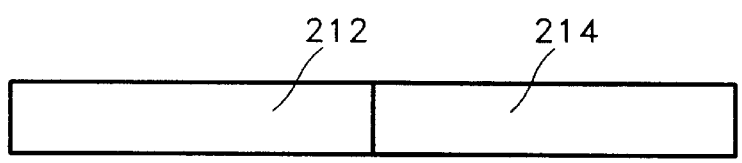
FIG. 3D is a timing diagram of a serial data output from the data output portion in the DAC interface apparatus in case that DA1 and DA2 are '10'.
Figure 3E:
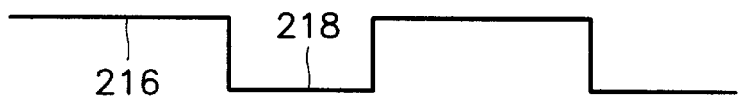
FIG. 3E is a timing diagram of a third control signal in the DAC interface apparatus in case that DA1 and DA2 are '01'.
Figure 3F:
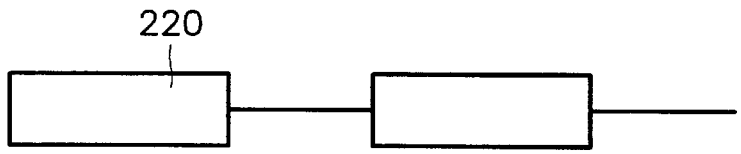
FIG. 3F is a timing diagram of a serial data output from the data output portion in the DAC interface apparatus in case that DA1 and DA2 are '01'.
Figure 3G:
FIG. 3G is a timing diagram of a third control signal in the DAC interface apparatus in case that DA1 and DA2 are '11'.
Figure 3H:
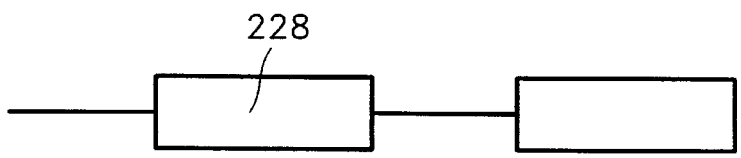
FIG. 3H is a timing diagram of a serial data output from the data output portion in the DAC interface apparatus in case that DA1 and DA2 are '11'.

FIG. 3A is a timing diagram of the left/right signal. FIGS. 3B and 3C are the timing diagrams of the third control signal C3 and the serial data output from the data output portion 32, respectively, when the first and second format control signals DA1 and DA2 are '00' (Specifically, DA1 is '0' and DA2 is '0'. The similar notation is used hereinunder) which signifies a 20-bit $I^2S$ right justified data format. FIG. 3D is a timing diagram of the serial data output from the data output portion 32 when DA1 and DA2 are '10', which signifies a 16-bit right justified Japanese data format. FIGS. 3E and 3F are the timing diagrams of the third control signal C3 and the serial data output from the data output portion 32, respectively, when the first and second format control signals DA1 and DA2 are '01', which signifies a 20-bit left justified data format. FIGS. 3G and 3H are the timing diagrams of the third control signal C3 and the serial data output from the data output portion 32, respectively, when the first and second format control signals DA1 and DA2 are '11', which signifies a 20-bit right justified data format.

For convenience, it is assumed that the parallel data is constituted of 40 bits.

OPERATION

The DAC interface apparatus according to the present invention recognizes the appropriate type of DAC according to the first and second format control signals DA1 and DA2 and output data in the appropriate data format to the DAC as shown in FIGS. 3C, 3D, 3F, and 3H.

The data input portion 30 shown in FIG. 1 receives the 40 bit parallel data in response to the data loading signal DL and stores the data in the second flip-flop 86 in synchronicity with the first control signal C1 during the enable section of the second control signal C2. The data output portion 32 receives the 40 bit data which is input serially from the data input portion 30 and outputs such data through the output terminal OUT1. When DA1 and DA2 are '00' the output portion 32 outputs the signal which is delayed by 1 bit in the third flip-flop 88, through the output terminal OUT1. When DA1 and DA2 are '10', data is serially output from the seventh multiplexor 90 through the output terminal OUT1. When DA1 and DA2 have other values, the serial data output from the data input portion 30 is immediately output through the output terminal OUT1 to the external DAC.

The system clock signal generating portion 10 divides the oscillator 50 frequency of 33.868 MHZ by twelve and outputs the resultant signal as the main clock signal of the DAC interface apparatus according to the present invention.

The bit clock generator 12 generates the bit clock signal for classifying the bits of data output from the output terminal OUT1. When DA1 and DA2 are '10', the bit clock generator 12 divides the frequency of the main clock signal by two and inverts the frequency-divided signal to output as the bit clock through the output terminal OUT2. When DA1 and DA2 have other values than '10', the bit clock generator inverts the main clock signal to output as the bit clock.

The counter 58 shown in FIG. 2 is a Mod-64 up-counter. The counter 58 receives the frequency-divided main clock signal when DA1 and DA2 are '10' or the main clock signal when DA1 and DA2 have other values than '10' from the first multiplexer 56. While carrying out counting operation, the counter 58 outputs various frequency-divided signals. The output signals from terminal $Q_0$ through $Q_5$ have frequencies of the input clock divided by two, four, eight, sixteen, thirty two and sixty four, respectively. On the basis of the frequency-divided signals the word clock generator 20, the load clock generator 26 and the left/right clock generator 28 generate respective control clock signals.

The right/left signal generator 28 outputs the left/right signal L/R through the output terminal OUT4. Here, the left/right signal is the signal for classifying whether the data output to the DAC should be right-justified or left-justified. In case DA1 and DA2 are '10', the signal whose frequency is divided by thirty two times the main clock signal is generated as the left/right signal. However in other cases, the signal whose frequency is divided by sixty four times the main clock signal is generated as the left/right signal. The left/right signal is output to the data output portion 32 and to the DAC through the output terminal OUT4.

The operations in the respective modes according to DA1 and DA2 are described as follows.

In case that DA1 and DA2 are '00', the signal SCLK output from the fifth AND gate 82 is not generated continuously during one period of the left/right signal shown in FIG. 3A. Specifically, the signal SCLK is not generated when the third control signal C3 is at "low" level, which lasts 12 bit clock cycles and is indicated by 204 in FIG. 3B, due to the signal LCS12 from the NOR gate 68 since the signal LCS12 blocks or cancels left 12 bits of the signal SCLK. However, the signal SCLK is generated when the third control signal C3 is at "high" level, which is indicated by 206 in FIG. 3B and lasts 20 bit clock cycles. Whenever the signal SCLK is generated, the data stored in the data input portion 30 are shifted in synchronicity with the signal SCLK, and thus 20 bits of data are serially output through the output terminal OUT1 as indicated by 208 in FIG. 3C.

If DA1 and DA2 are '11', a similar operation is carried out. That is, the signal SCLK is not generated when the third control signal C3 is at "low" level, which lasts 12 bit clock cycles and is indicated by 224 in FIG. 3G, due to the signal LCS12 from the NOR gate 68 since the signal LCS12 blocks or cancels left 12 bits of the signal SCLK. However, the signal SCLK is generated when the third control signal C3 is at "high" level, which is indicated by 226 in FIG. 3G and lasts 20 bit clock cycles. Whenever the signal SCLK is generated, the data stored in the data input portion 30 are shifted in synchronicity with the signal SCLK, and thus 20 bits of data are serially output through the output terminal OUT1 as indicated by 228 in FIG. 3H.

If DA1 and DA2 are '10', the signal SCLK is generated 16 times when the third signal C3 is at "low" level. The signal SCLK is generated 16 times when the third control signal C3 is at "low" level, also. Thus, during one period of the third control signal C3, 32 bits of data stored in the data input porion 30 are shifted in synchronicity with the signal SCLK to be output serially through the output terminal OUT1 as indicated by 212 in FIG. 3D.

If DA1 and DA2 are '01', the signal SCLK output from the fifth AND gate 82 is not generated continuously during one period of the left/right signal shown in FIG. 3A. Specifically, the signal SCLK is generated when the third control signal C3 is at "high" level, which is indicated by 216 in FIG. 3E and lasts 20 bit clock cycles. However, the signal SCLK is not generated when the third control signal C3 is at "low" level, which lasts 12 bit clock cycles and is indicated by 218 in FIG. 3E, due to the signal RCS12 from the AND gate 64 since the signal RCS12 blocks or cancels right 12 bits of the signal SCLK. Whenever the signal SCLK is generated, the data stored in the data input portion 30 are shifted in synchronicity with the signal SCLK, and thus 20 bits of data are serially output through the output terminal OUT1 as indicated by 220 in FIG. 3F.

As mentioned above, the DAC interface apparatus according to the present invention makes it possible for an apparatus to interface with a desired external DAC regardless of the data format required by the DAC.

What is claimed is:

1. A digital-to-analog converter interface apparatus for interfacing a digital-to-analog converter with an equipment which requires said digital-to-analog converter, comprising:

data input means for receiving parallel digital data from said equipment in response to a data loading signal and storing the parallel digital data;

data output means for selectively outputting data input from said data input means in response to a first and a second format control signals and a left/right signal;

system clock generating means for generating a main clock signal for said digital-to-analog converter interface apparatus;

bit clock generating means for dividing the frequency of the main clock signal in response to a third format control signal and inverting the frequency-divided main clock signal;

control clock generating means for dividing the frequency-divided main clock signal and generating a first through a sixth control clock signals;

word clock generating means for receiving the first through the fourth control clock signals and an inverted signal of a fourth control clock signal, generating a left-cancelling signal and a right-cancelling signal, selecting one of the left-cancelling signal and the right-cancelling signals in response to the first and the second format control signals to output the selected signal as the fourth control signal, and selecting one of the control clock signals and the inverted signal of the fourth control signal in response to the third format control signal to output the selected signal as a third control signal;

load clock generating means for receiving said control clock signals and said frequency-divided main clock signal and outputting a second control signal and said data loading signal in response to the third format control signal; and a first OR gate for performing a logic OR operation with respect to the fourth control signal and the frequency-divided main clock signal and outputting the result as a first control signal, wherein the third format control signal is obtained by performing a NOR operation with respect to the second format control signal and an inverted signal of the first format control signal, and the left/right signal defines the justification of the data output from the data output means.

2. The digital-to-analog converter interface apparatus as claimed in claim 1, wherein said system clock generating means comprises:

oscillating means for generating a signal having a predetermined frequency; and frequency dividing means for dividing the frequency of the signal output by said oscillating means by a predetermined number and outputting the frequency-divided signal as the main clock signal.

3. The digital-to-analog converter interface apparatus as claimed in claim 1, wherein said bit clock generating means comprises:

a first flip-flop connected for receiving the main clock signal as a clock input and its own inverted output as a data input;

a first multiplexor for receiving as inputs an output signal of said first flip-flop and the main clock signal, selecting one of the received signals in response to said third format control signal, and outputting the selected signal as the frequency-divided main clock signal; and a first inverter for inverting the frequency-divided main clock signal and outputting the inverted signal to said digital-to-analog converter for clocking input of serial data by said digital-to-analog converter.

4. The digital-to-analog converter interface apparatus as claimed in claim 1, wherein said control clock generating means comprises a counter for receiving the frequency-divided main clock signal, counting the received main clock signal so as to form a counted value, and outputting each bit of the counted value as first, second, third, fourth, fifth and sixth control clock signals respectively.

5. The digital-to-analog converter interface apparatus as claimed in claim 4, wherein said word clock generating means comprises:

a second OR gate for performing a logic OR operation with respect to the third and the fourth control clock signals;

a first AND gate for performing a logic AND operation with respect to the output of said second OR gate and the fifth control clock signal;

a second AND gate for performing a logic AND operation with respect to the third and the fourth control clock signals;

a NOR gate for performing a logic NOR with respect to the output of said second AND gate and the fifth control clock signal;

a second multiplexor for receiving the output of said NOR gate, the output of said first AND gate and a first supply voltage level, and selectively outputting one of such signals in response to the first and second format control signals; and a third multiplexor for receiving an inverted signal of the fourth control signal and the fourth control clock signal, selecting one of such signals in response to the third format control signal, and outputting the selected signal as a third control signal.

6. The digital-to-analog converter interface apparatus as claimed in claim 5, further comprising a fourth multiplexor for receiving the fifth and the sixth control clock signals and selectively outputting one of such signals as said left/right signal in response to the third format control signal.

7. The digital-to-analog converter interface apparatus as claimed in claim 6, wherein said load clock generating means comprises:

a fifth multiplexor for receiving the sixth control clock signal and a second supply voltage level and selectively outputting one of such signals in response to the third format control signal;

a third AND gate for performing a logic AND operation with respect to the first, the second and the third control clock signals;

a fourth AND gate for performing a logic AND operation with respect to the third and the fourth control clock signals and the output of said fifth multiplexor;

a NAND gate for performing a logic NAND operation with respect to the outputs of said third and said fourth AND gates and outputting the operation result as said data loading signal; and a third OR gate for performing a logic OR operation with respect to the output of said NAND gate and said frequency-divided main clock signal and outputting the operation result as said second control signal.

8. The digital-to-analog converter interface apparatus as claimed in claim 7, wherein said data input means comprises:

a sixth multiplexor for selectively outputting one of said parallel input data, predetermined bits among the outputs of said data input means and a first supply voltage level in response to said data loading signal;

a fifth AND gate for performing a logic AND operation with respect to said first and second control signals;

a second flip-flop for receiving the output of said fifth AND gate as a clock input and the output of said sixth multiplexor as data input and outputting the received signal to said data output means; and a third flip-flop for receiving the last bit of the signal output from said second flip-flop as data input and the output of said fifth AND gate as a clock input and outputting the received signal to said data output means in synchronicity with the clock input.

9. The digital-to-analog converter interface apparatus as claimed in claim 8, wherein said data output means comprises:

a seventh multiplexor for receiving predetermined bits of the signal output from said second flip-flop and selectively outputting them in response to said left/right signal; and an eighth multiplexor for receiving the outputs of said second and third flip-flops and the output of said seventh multiplexor, and selectively outputting them as a serial representation of said parallel data to said digital-to-analog converter in response to the first and second format control signals.

10. A method of converting a data format of a parallel digital input word to a selected format for input to a digital-to-analog converter, the method comprising the steps of:

generating a periodic system clock signal;

generating a bit clock signal responsive to the system clock signal;

selectively inverting or non-inverting the bit clock signal responsive to the selected format to form a bit clock output signal; and providing the bit clock output signal to the digital-to-analog converter for clocking a serial stream of output data to the digital-to-analog converter using the selected format.

11. A method according to claim 10 wherein the selected format is a bit serial output format.

12. A method according to claim 10 including:

storing the parallel digital input word;

serially clocking a first portion of the stored digital input word out to the digital-to-analog converter responsive to a first logic state of a control signal;

clocking no data out to the digital-to-analog converter while the control signal is in a second state; and then serially clocking a remainder of the stored digital input word out to the digital-to-analog converter responsive to the control signal returning to the first state.

13. A method according to claim 10 including right justifying the output stream of serial data so as to synchronize transfer of a least significant bit (lsb) of the input word to a predetermined transition of the control signal.

14. A method according to claim 10 including left justifying the output stream of serial data so as to synchronize transfer of a most significant bit (msb) of the input word to a predetermined transition of the control signal.

* * * * *